May 24, 1955   W. J. SCHNEIDER   2,709,245
ELECTRICAL CONNECTIONS FOR ELECTRIC APPLIANCES
Filed Dec. 11, 1950
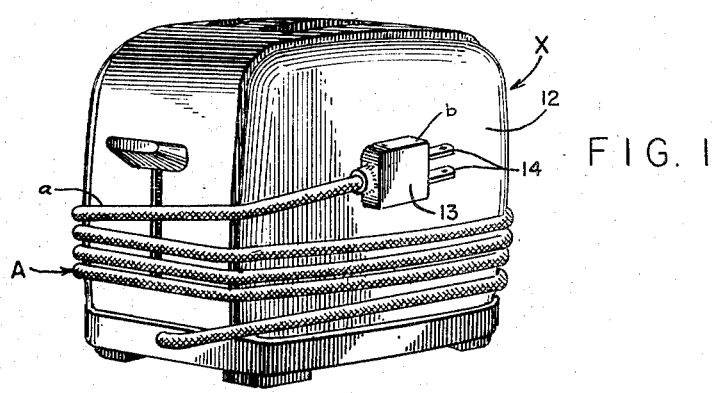
FIG. 1
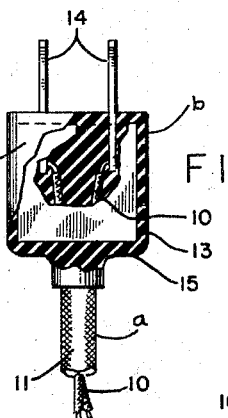
FIG. 2
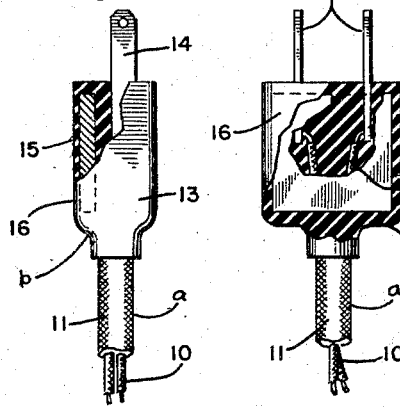
FIG. 3
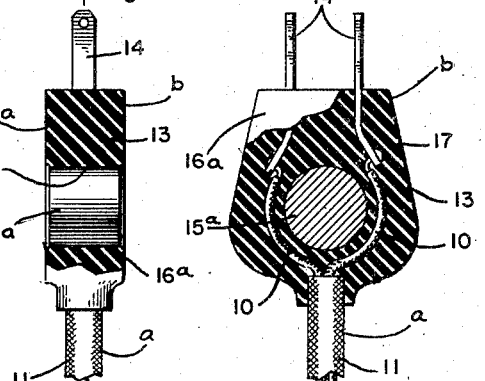
FIG. 4   FIG. 5
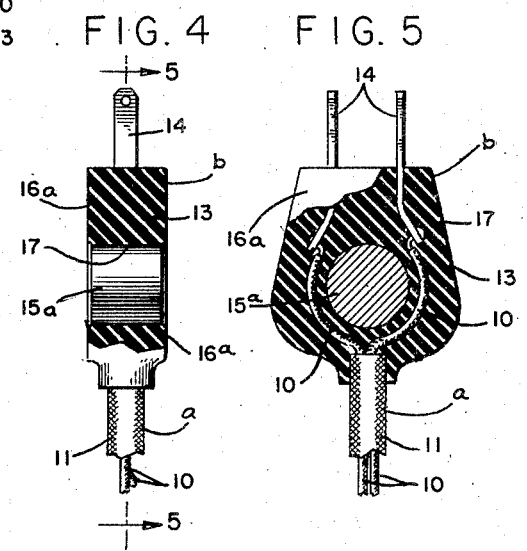
FIG. 6   FIG. 7
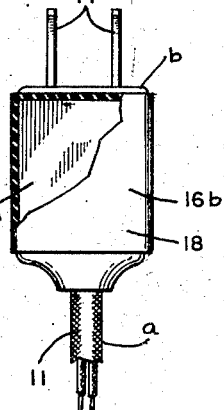
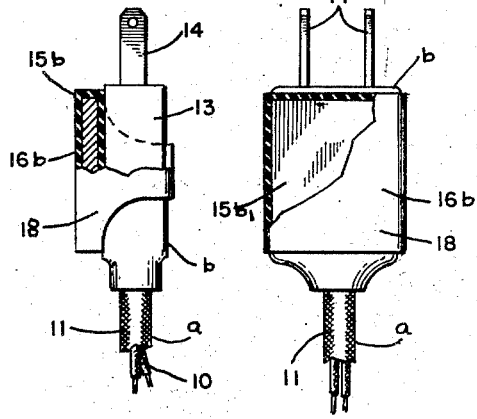
INVENTOR
WARREN J. SCHNEIDER
BY
ATTORNEYS United States Patent Office 2,709,245
Patented May 24, 1955

2,709,245

ELECTRICAL CONNECTIONS FOR ELECTRIC APPLIANCES

Warren J. Schneider, Christmas Lake, Excelsior, Minn.

Application December 11, 1950, Serial No. 200,163

7 Claims. (Cl. 339—12)

My invention relates to improvements in electrical connections for electric appliances and particularly that type of appliance having a case with a face portion thereof formed of material of low resistance to magnetic flux.

The conventional electrical connection for electrical appliances ordinarily includes a relatively flexible electric cord for supplying current to the appliance to which it is fitted and also includes at the free end of such cord a connector customarily in the form of a male plug which is removably applicable to a conventional electric outlet or receptacle. When such a connection is in disuse, the cord is often wrapped about the appliance served thereby and the end of the cord bearing the connector is entwined between turns of the cord for the purpose of holding the cord wrapped about the appliance. This entwining of the end of the wrapped cord between turns thereof frequently fails to hold the cord, as intended, in snugly wrapped disposition of disuse and it frequently results in the entangling of the cord when an attempt is made to unwrap the same from the appliance for re-use.

An object of my invention is to provide a simple, durable and inexpensive electrical connection for an electric appliance having a case with a face portion thereof of material of low reluctance to magnetic flux, such connection including an electric cord and a connector at the free end of said cord, the cord being adapted in disuse to be wrapped about the case of the appliance and the connector having a magnet associated therewith and adapted to cause the connector to cling to said portion of the case and thereby releasably hold the cord snugly in its wrapped disposition about the case.

In my improved electrical connection, the connector at the free end of the electric cord, similarly to the conventional connector, includes a body member and a pair of contact members electrically connected with the cord and engageable at one end of said body member with an electrical outlet or receptacle. This body member, however, has a bearing face at one side thereof which is shaped substantially to conform with and which is adapted to be brought against that portion of the case of the appliance juxtaposed by the connector in the wrapped disposition of the electric cord about said case, which portion at least of said case will be of material of low reluctance to magnetic flux. A magnet is associated with the body member of the connector so that when said bearing face of said body member is brought against said portion of the appliance case, the magnet will be attracted to the case causing the connector to cling thereto and to hold said cord wrapped about the case. Preferably, the bearing face of the connector body is a friction face which will tend to keep the connector body from slipping along the case of an appliance and thereby permit the employment of a relatively weak magnet for the purpose intended.

In the drawing:

Fig. 1 is a perspective view of a common form of electrical appliance, the same being a bread toaster equipped with an electrical connection in embodiment of my invention.

Fig. 2 is an elevational view showing edgewise the connector and a portion of the cord of the electrical connection shown in Fig. 1, a portion of the connector being broken away to reveal the magnet embedded in the body thereof.

Fig. 3 is an elevational view showing facewise the connector illustrated in Fig. 2, a portion of the connector body being broken away to reveal the magnet embedded therein.

Fig. 4 is a view similar to Fig. 2 showing a modified form of connector.

Fig. 5 is a sectional view taken as on the line 5—5 of Fig. 4.

Fig. 6 is an elevational view partly broken away and showing edgewise a connector equipped with a magnet in accordance with my invention.

Fig. 7 is a view similar to Fig. 6 showing facewise the structure therein illustrated.

Reference being had to the drawing, it will be understood that the electrical connection A therein illustrated consists of an electric cord $a$ and a connector $b$ electrically connected with said cord at the free end thereof, the other end of said cord being adapted to be electrically connected with an appliance to which current is to be supplied by said connection, such an appliance in the form of an electric toaster X being shown in Fig. 1.

The electric cord $a$, is made up in conventional manner of a pair of wires 10 shielded within a casing 11, said cord being readily flexible to facilitate the wrapping of the same, in disuse, about the case of an appliance, such as the case 12 of said toaster X, the entire face of which, or at least a portion thereof, will be of steel or other material of low reluctance to magnetic flux.

The connector $b$ shown in Figs. 1, 2 and 3 consists of a body member 13 of insulating material and a pair of contact members 14 in the form of prongs embedded at their butt portions in said body member and projecting from one end thereof for insertion into a conventional electric outlet or receptacle in usual manner. Said body member 13 preferably will be of molded rubber of some resiliency and somewhat soft and at the end thereof opposite said contact members 14, said body member 13 will be molded about the free end of the cord-casing $a$ with the terminal portions of the wires 10 of said cord embedded in said body member 13 and connected with said contact members 14. Also embedded in the body member 13 by being moulded therein is a plate-like permanent magnet 15, preferably an Alnico magnet, approximately of the size and shape of one of the faces of the body member, as at 16. This plate-like magnet 15 occupies a position in parallelism with said face 16 and lies closely adjacent thereto so that only a relatively thin layer of the material of the body member 13 covers the magnet next to said face 16 of said member 13 which face 16 is employed as a bearing face for said member 13 in face-to-face application thereof against the face of the appliance case about which the cord $a$ is wrapped when the electrical connection A is in disuse. Said face 16 of the conector $b$ is shown as a flat face to conform with the correspondingly flat face portion of an appliance case against which it would be brought, as in Fig. 1. However, it is to be understood that said bearing face 16 would be contoured to conform substantially with whatever contour might obtain at the particular face portion of any appliance case against which said bearing face 16 was to be brought after the fashion shown in Fig. 1. With the cord $a$ wrapped about the case of an appliance and with the bearing face 16 of the connector $b$ placed against a face portion of said case, the magnet 15 will set up magnetic flux along lines traversing said bearing face 16 and said face portion of said case causing the connector b to be attracted to the case with clinging force tethering the cord a against unwrapping from a wrapped disposition thereof about said case. The body member 13 of the connector b being of relatively soft rubber, the bearing face 16 of said member will frictionally resist sliding along the case of an appliance. Consequently, the connector b with such a friction surface 16, as compared with a relatively hard non-friction surface, will hold fast to an appliance case under the attraction of a magnet of relatively weak magnetic force.

In the modified form of my invention shown in Figs. 4 and 5, the body member 13 and contact members 14 of the connector b and the electric cord a with wires 10 therein are of the same general construction and arrangement as the corresponding and similarly designated elements employed in the form of my invention shown in Figs. 2 and 3. However, it is to be noted that in said modification, the magnet 15ª is in the form of a cylindrical plug which is lodged in a bore 17 formed in the body member 13 and extending therethrough from one face thereof to the other between the butts of the contact members 14 and the wires 10 with which said contact members are connected. Further, it is to be noted that the body member 13 of the connector b in said modification has dual bearing faces 16ª, one at either side of said member 13, whereby the bearing face at either of said sides of said member 13 may be placed against an appliance case to anchor said member thereto and thus secure the cord a against unwrapping from such case.

In the second modification shown in Figs. 6 and 7, the connector b with its contact members 14 and attached cord a may compare with the similarly designated parts in the first described form of the invention shown in Figs. 2 and 3, it being unimportant whether or not the body member 13 of said connector is of relatively soft material to provide a friction bearing face at one side thereof. In this second modification, the friction bearing face 16ᵇ for the body member 13 of the connector b is provided by an outer face portion of an elastic band 18 encompassing said body member b. The magnet 15ᵇ in plate-like form, instead of being incorporated directly in the body member 13 of the connector is incorporated in the band 18 next to said bearing face 16ᵇ. If the bearing face 16ᵇ provided by the band 18 is to be placed against a flat face portion of an appliance case, the magnet 15ᵇ will likewise be flat. So also the face of the body member 13 of the connector b against which the magnet-equipped portion of the band 18 is backed will preferably be flat. However, as in the previously described forms of the invention, this second modification will, in any case have its friction bearing face 16ᵇ of a contour substantially conforming with the contour of the face portion of the appliance case against which said bearing face is to be placed in anchoring the connector b to the case.

Changes in the specific form of my invention, as herein described, may be made within the scope of what is claimed without departing from the spirit of my invention.

Having described my invention, what I claim as new and desire to protect by Letters Patent is:

1. An electrical connection for an electric appliance having a case with a face portion thereof formed of material of low reluctance to magnetic flux, said connection comprising an electric cord leading from the appliance and a connector attached to the free end of the cord, said cord being readily flexible and adapted in disuse to be wrapped about said case, said connector including a body member and a pair of contact members electrically connected with said cord and engageable at one end of said body member with an electrical outlet, said body member having a bearing face at one side thereof adapted to be brought against said face portion of said case in the wrapped disposition of said cord about the case, said body member being formed with a bore therein axially disposed transversely with respect to said bearing face thereof, and a plug-like magnet contained within said bore, said magnet setting up magnetic flux along lines traversing said bearing face of said body and said face portion of said case against which said body is brought causing the connector to cling to the case and hold said cord wrapped thereon.

2. An electrical connection for an electric appliance having a case with a face portion thereof formed of material of low reluctance to magnetic flux, said connection comprising an electric cord leading from the appliance and a connector attached to the free end of the cord, said cord being readily flexible and adapted in disuse to be wrapped about said case, said connector including a body member and a pair of contact members electrically connected with said cord and engageable at one end of said body member with an electrical outlet, an elastic band embracing said body member, and a magnet secured to said body member by said elastic band, said elastic band providing a friction bearing face for said body member at one side thereof adapted to be brought against said face portion of said case in the wrapped disposition of said cord about the case, said magnet setting up magnetic flux along lines traversing said friction bearing face of said band and the said face portion of said case against which said friction bearing face is brought causing the connector to cling to the case and hold said cord wrapped thereon.

3. An electrical connection for an electric appliance having a case with a face portion thereof formed of material of low reluctance to magnetic flux, said connection comprising an electric cord leading from the appliance and a connector attached to the free end of the cord, said cord being readily flexible and adapted in disuse to be wrapped about said case, said connector including a body member and a pair of contact members electrically connected with said cord and engageable at one end of said body member with an electrical outlet, an elastic band embracing said body member, a magnet embedded in a portion of said band, said band at said portion thereof providing a friction bearing face for said body member at one side thereof adapted to be brought against said face portion of said case in the wrapped disposition of said cord about the case, said magnet setting up magnetic flux along lines traversing said friction bearing face and the said face portion of said case against which said friction bearing face is brought causing the connector to cling to the case and hold said cord wrapped thereon.

4. An electrical connection for an electric appliance having in its structure a case with a face portion thereof formed of material of low reluctance to magnetic flux, said connection comprising an electric cord adapted to lead from an appliance, as aforesaid, and a connector attached to the free end of the cord, said cord being readily flexible and adapted in disuse to be wrapped about the case of such an appliance, said connector including a body member and a pair of contact members electrically connected with said cord and engageable at one end of said body member with an electrical outlet, said body member having a bearing face at one side thereof substantially conforming with the face portion of the case of an appliance as aforesaid, said bearing face being adapted to be brought against such face portion of such a case in the wrapped disposition of said cord about such case, and magnet means associated with said body member, said means setting up magnetic flux along lines traversing said bearing face of said body and traversing also the face portion of the case of an appliance, as aforesaid, formed of material of low reluctance to magnetic flux, against which said body member is brought, thereby to cause the connector to cling to such case and hold said cord wrapped thereon.

5. An electrical connection for an electric appliance having in its structure a case with a face portion thereof formed of material of low reluctance to magnetic flux, said connection comprising an electric cord adapted to lead from an appliance, as aforesaid, and a connector attached to the free end of the cord, said cord being readily flexible and adapted in disuse to be wrapped about the case of such an appliance, said connector including a body member and a pair of contact members electrically connected with said cord and engageable at one end of said body member with an electrical outlet, said body member having a friction bearing face at one side thereof adapted to be brought against the face portion of the case of an appliance, as aforesaid, in the wrapped disposition of said cord about such case, and magnet means associated with said body member, said means setting up magnetic flux along lines traversing said friction bearing face to said body and traversing also the face portion of the case of an appliance, as aforesaid, formed of material of low reluctance to magnetic flux, against which said body is brought, thereby to cause the connector to cling to such case and hold said cord wrapped thereon.

6. An electrical connection for an electric appliance having in its structure a case with a face portion thereof formed of material of low reluctance to magnetic flux, said connection comprising an electric cord adapted to lead from an appliance, as aforesaid, and a connector attached to the free end of the cord, said cord being readily flexible and adapted in disuse to be wrapped about the case of such appliance, said connector including a body member and a pair of contact members electrically connected with said cord and engageable at one end of the body member with an electrical outlet, said body member being of resilient material, one side thereof providing a friction bearing face therefor adapted to be brought against the face portion of the case of an appliance, as aforesaid, in the wrapped disposition of said cord about such case, and a plate-like permanent magnet embedded in said body member adjacently parallel to said bearing face, said magnet setting up magnetic flux along lines traversing said friction bearing face of said body and traversing also the face portion of the case of an appliance, as aforesaid, formed of material of low reluctance to magnetic flux, against which said body is brought, thereby to cause the connector to cling to such case and hold said cord wrapped thereon.

7. An electrical connection for an electric appliance having in its structure a case with a face portion thereof formed of material of low reluctance to magnetic flux, said connection comprising an electric cord adapted to lead from an appliance, as aforesaid, and a connector attached to the free end of the cord, said cord being readily flexible and adapted in disuse to be wrapped about the case of such an appliance, said connector including a body member and a pair of contact members electrically connected with said cord and engageable at one end of said body member with an electrical outlet, means providing a bearing face for said body member at one side thereof adapted to be brought against the face portion of the case of an appliance, as aforesaid, in the wrapped disposition of said cord about such case, and a magnet secured relative to said body member by said means, said magnet setting up magnetic flux along lines traversing said bearing face and traversing also the face portion of the case of an appliance, as aforesaid, formed of material of low reluctance to magnetic flux, against which said bearing face is brought, thereby to cause the connector to cling to the case and hold said cord wrapped thereon.

References Cited in the file of this patent

UNITED STATES PATENTS

| | | |
|---|---|---|
| 1,229,493 | Mallin | June 12, 1917 |
| 1,641,880 | Cohen | Sept. 6, 1927 |
| 2,143,529 | White | Jan. 10, 1939 |
| 2,170,287 | Kinnebrew | Aug. 22, 1939 |
| 2,204,396 | Barnes | June 11, 1940 |
| 2,414,653 | Lookholder | Jan. 21, 1947 |
| 2,474,942 | Hawkins | July 5, 1949 |
| 2,536,776 | Smellie | Jan. 2, 1951 |